… … …

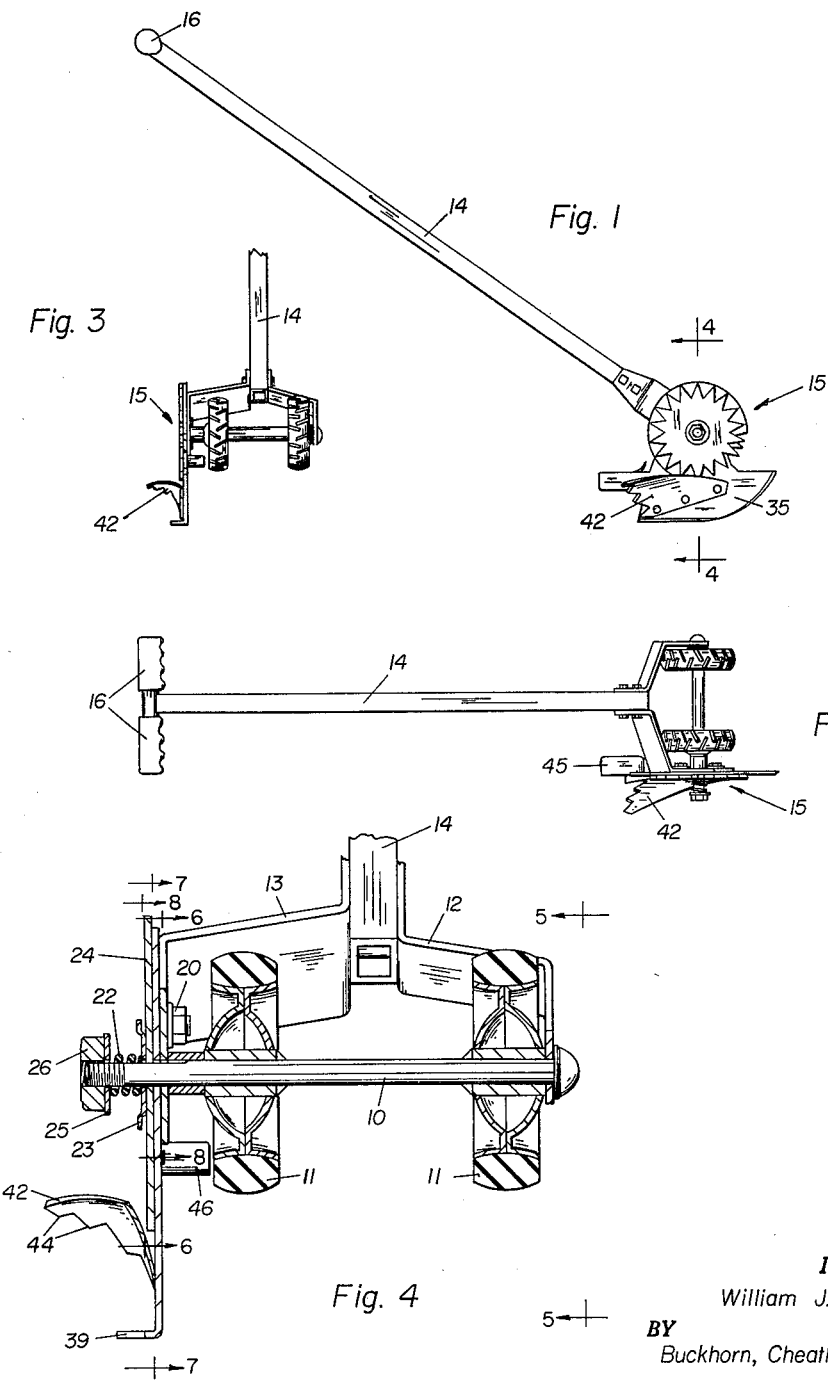

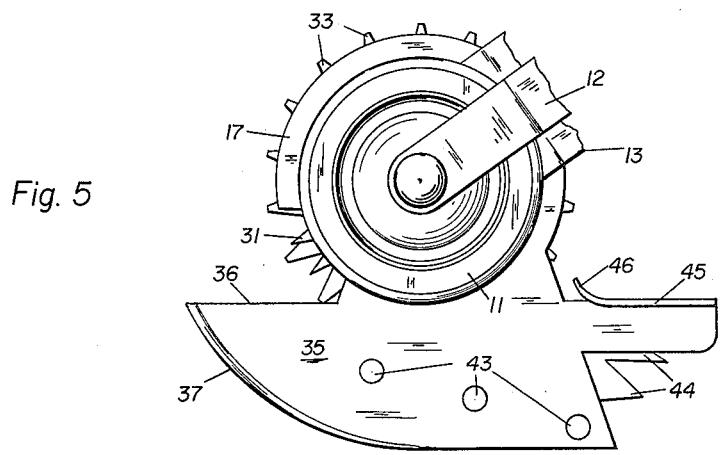
Fig. 5
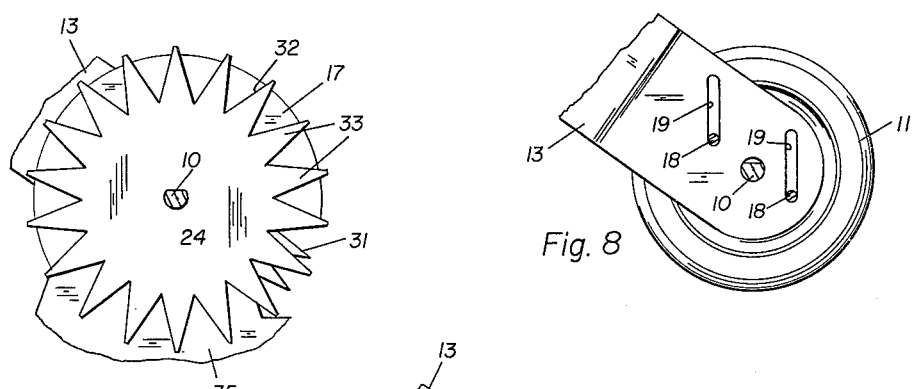
Fig. 6
Fig. 8
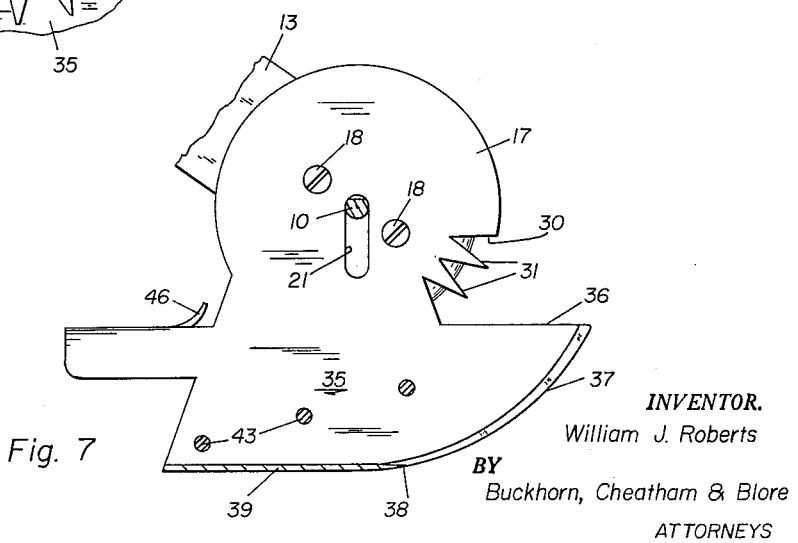
Fig. 7
INVENTOR.
William J. Roberts
BY
Buckhorn, Cheatham & Blore
ATTORNEYS

United States Patent Office 3,093,195
Patented June 11, 1963

3,093,195
GARDEN EDGING TOOL
William John Roberts, 3600 SE. Crystal Springs Blvd., Portland, Oreg.
Filed Dec. 19, 1960, Ser. No. 76,536
3 Claims. (Cl. 172—16)

My present invention comprises an improvement in an agricultural implement which may be termed a garden edging tool, the device comprising means whereby edging may be accomplished at the same time that the adjacent soil is turned and broken up. The principal object of the present invention is to provide means whereby the lawn adjacent a cultivated garden may be neatly edged, but other uses will be readily apparent, such as the cultivation of rows of strawberries or other plants tending to produce runners, the runners being clipped off while loosening of the soil is being accomplished.

A principal object of the present invention is to provide a tool having the combined functions noted above, which is easily operated, and is made of relatively few sturdy, economically fabricated and easily assembled parts.

The objects and advantages of the present invention will be more readily apparent from inspection of the accompanying drawings, taken in connection with the following specification, wherein like numerals refer to like parts throughout.

In the drawings,

FIG. 1 is a side elevation of the present invention;

FIG. 2 is a plan view of the present invention;

FIG. 3 is a partial front elevation of the present invention;

FIG. 4 is a vertical section, on an enlarged scale, taken substantially along line 4—4 of FIG. 1;

FIG. 5 is a view, in elevation, taken substantially from the line 5—5 of FIG. 4;

FIG. 6 is a partial vertical section taken substantially along line 6—6 of FIG. 4;

FIG. 7 is a partial vertical section taken substantially along line 7—7 of FIG. 4; and FIG. 8 is a partial vertical section taken substantially along line 8—8 of FIG. 4.

The present invention comprises an agricultural implement of the push truck type, including a transverse axle 10, ground engaging wheel means 11 fixed to said axle, axle mounting means comprising a pair of arms 12 and 13 secured to the lower end of a push shaft 14 and journaling said axle, and an edger 15 operatively associated with said axle. The wheel means 11 preferably comprise cleated treads whereby the axle is caused to turn as the implement is reciprocated while being gradually moved forward. The push rod 14 preferably is provided with transverse hand grips 16 at its upper end. The edger 15 comprises a fixed clipper plate 17 secured vertically to the arm 13 by means of flush countersunk bolts 18 which pass through elongated vertical slots 19 in the arm 13 and are engaged by nuts 20, whereby the clipper plate 17 may be vertically adjusted with respect to the wheel means. The axle 10 passes through an elongated vertical slot 21 in the fixed clipper plate 17 in order to permit such vertical adjustment. The edger also comprises a rotating clipper plate 24 which is provided with a three-quarter round opening and the axle has a one-quarter flat whereby the rotating clipper plate is keyed to the axle 10 for rotation therewith. The rotating clipper plate is maintained flush against the outer surface of the fixed clipper plate 17 by means of a spring 22 surrounding the outer end of axle 10 and bearing against an inner washer 23 and an outer washer 25 which bears against a nut 26 on the end of the shaft.

The fixed clipper plate 17 is provided with a plurality of relatively large, forwardly opening notches 30 which define a plurality of fixed cutter blades 31 in a forward portion of the fixed plate 17 immediately above the ground engaging portions of the wheel means. The rotating clipper plate 24 is provided with a plurality of relatively large notches 32 throughout its periphery defining a plurality of radially extending angular cutter blades 33 which sheer past the fixed blades 31 as the axle rotates. Grass, grass roots, runners and the like are thereby vertically trimmed from the adjoining plant or grass and root masses.

As so far described, the implement is essentially a wheeled, pusher type edger having fixed and rotating clipper plates in sheering relation to each other.

The improvement of the present invention comprises an integral, vertically depending extension 35 of the fixed clipper plate 17. The extension 35 has a horizontally extending upper edge 36 which projects forwardly from the lowermost notch 30, and a sharp forward edge 37 which extends angularly downward and rearwardly from the forward tip of the edge 36 to a point beneath the notches 30, the extension thereby defining a vertical plowshare which cuts a vertical slot in the soil beneath the trimmed edge produced by the edger. The sharpened edge 37 merges into the forwardly sharpened edge 38 of a relatively narrow, laterally extending horizontal flange 39 at the lower extremity of the extension 35, which flange extends rearwardly to a point substantially beneath the rear extremity of the edger, the flange defining a breaker which tends to lift the soil on the side away from the wheel means. The breaker cuts a horizontal slot in the ground, and clods and lumps of earth which are thereby somewhat separated are pulled and jerked upwardly and rearwardly as the implement is reciprocated.

A moldboard 42 comprising an outwardly curved metal plate is fixed to the outer surface of the extension 35 by means of a plurality of rivets 43. The lower edge of the moldboard extends angularly downward from front to rear and the upper edge curves outwardly from front to rear. The rear edge of the moldboard is provided with a plurality of serrations 44 which break up clods as the implement is jerked rearwardly during use.

The extension 35 is also provided with an inwardly directed depth limiting flange 45 having an upwardly curved, forward end 46. The flange 45 is of substantial length and extends horizontally inward so as to overlie the solid turf adjoining a garden area. The forwardly curved portion of the flange prevents the flange from digging into the turf as the tool is pushed forwardly. The depth limiting flange provides a ground engaging shoe which limits penetration of the vertical plowshare into the ground, and provides a fulcrum tending to move the forward cutting edge 37 upwardly and out of the ground in a slicing manner as the implement is pushed away from the operator.

Having illustrated and described a preferred form of the invention, it should be apparent to those skilled in the art that the same permits of modification in arrangement and detail. I claim as my invention all such modifications as come within the true spirit and scope of the following claims:

1. In an agricultural implement of the push truck type including a transverse axle, ground engaging wheel means fixed to said axle, axle mounting means rotatably journaling said axle, and an edger comprising a fixed clipper plate and a rotating clipper plate, said fixed clipper plate being secured to said mounting means radially with respect to said axle and having forwardly open notches therein defining a plurality of fixed blades in concentric relation to said axle, and said rotating clipper plate being secured to said axle, lying flush against said fixed clipper plate and having notches therein throughout its periphery defining a plurality of rotating blades which sheer past said fixed blades when said axle rotates; the improvement of a plowshare beneath said rotating clipper plate and comprising an integral, vertically depending extension of said fixed clipper plate, said extension having a sharp forward edge beginning at a point forwardly of said rotating clipper plate and curving downwardly and rearwardly beneath said rotating clipper plate, a moldboard fixed to said extension beneath said rotating clipper plate and extending outwardly therefrom away from said wheel means, and an outwardly directed breaker flange secured rigidly to the bottom end of said vertically depending extension and underlying said moldboard.

2. In an agricultural implement of the push truck type including a transverse axle, ground engaging wheel means fixed to said axle, axle mounting means rotatably journaling said axle, and an edger comprising a fixed clipper plate and a rotating clipper plate, said fixed clipper plate being secured to said mounting means radially with respect to said axle and having forwardly open notches therein defining a plurality of fixed blades in concentric relation to said axle, and said rotating clipper plate being secured to said axle, lying flush against said fixed clipper plate and having notches therein throughout its periphery defining a plurality of rotating blades which sheer past said fixed blades when said axle rotates; the improvement of a plowshare beneath said rotating clipper plate and comprising an integral, vertically depending extension of said fixed clipper plate, said extension having a sharp forward edge beginning at a point forwardly of said rotating clipper plate and curving downwardly and rearwardly beneath said rotating clipper plate, and a moldboard fixed to said extension beneath said rotating clipper plate and extending outwardly therefrom away from said wheel means, said extension having an outwardly directed breaker flange underlying said moldboard and an inwardly directed depth limiting flange lying rearwardly of said rotating clipper plate.

3. In an agricultural implement of the push truck type including a transverse axle, ground engaging wheel means fixed to said axle, axle mounting means rotatably journaling said axle, and an edger comprising a fixed clipper plate and a rotating clipper plate, said fixed clipper plate being secured to said mounting means radially with respect to said axle and having forwardly projecting fixed blade means, and said rotating clipper plate being secured to said axle, lying flush against said fixed clipper plate and having notches therein throughout its periphery defining a plurality of rotating blades which sheer past said fixed blade means when said axle rotates; the improvement of a plowshare beneath said rotating clipper plate and comprising an integral, vertically depending extension of said fixed clipper plate, said extension having a sharp forward edge beginning at a point forwardly of said rotating clipper plate and curving downwardly and rearwardly beneath said rotating clipper plate, and a moldboard fixed to said extension beneath said rotating clipper plate and extending outwardly therefrom away from said wheel means, said extension having an inwardly directed depth limiting flange lying rearwardly of said rotating clipper plate and said ground engaging wheel means.

References Cited in the file of this patent

UNITED STATES PATENTS

| | | |
|---|---|---|
| 243,570 | Jefferson | June 28, 1881 |
| 536,497 | Warren | Mar. 26, 1895 |
| 1,065,946 | Janson | July 1, 1913 |
| 1,313,866 | Sopousek | Aug. 19, 1919 |
| 1,721,661 | Hawney | July 23, 1929 |
| 1,800,166 | Wallen | Apr. 7, 1931 |
| 2,433,659 | Gibson | Dec. 30, 1947 |
| 2,476,461 | Smith | July 19, 1949 |
| 2,848,933 | Morton | Aug. 26, 1958 |

FOREIGN PATENTS

| | | |
|---|---|---|
| 109,925 | Australia | Feb. 26, 1940 |